US012574215B2

(12) United States Patent
Goodman et al.

(10) Patent No.: US 12,574,215 B2
(45) Date of Patent: Mar. 10, 2026

(54) SYSTEM AND METHOD FOR MANAGING THE SECURITY OF SENSITIVE DATA USING MULTIPLE ENCRYPTION

(71) Applicant: Dell Products L.P., Round Rock, TX (US)

(72) Inventors: Bradley K. Goodman, Nashua, NH (US); Eric Joseph Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 296 days.

(21) Appl. No.: 18/301,621

(22) Filed: Apr. 17, 2023

(65) Prior Publication Data

US 2024/0348426 A1 Oct. 17, 2024

(51) Int. Cl.
H04L 9/08 (2006.01)
G06F 21/60 (2013.01)
H04L 9/30 (2006.01)
H04L 9/32 (2006.01)

(52) U.S. Cl.
CPC .......... H04L 9/0822 (2013.01); G06F 21/602 (2013.01); H04L 9/3073 (2013.01)

(58) Field of Classification Search
CPC ... H04L 9/0822; H04L 9/3073; H04L 9/0894; G06F 21/602
USPC ........................................................ 713/189
See application file for complete search history.

(56) References Cited

U.S. PATENT DOCUMENTS

| | | | | |
|---|---|---|---|---|
| 8,509,449 B2 * | 8/2013 | Ureche | ................. | H04L 9/0894 |
| | | | | 380/284 |
| 11,405,200 B1 * | 8/2022 | Hamel | ................. | H04L 9/0822 |
| 12,273,443 B2 * | 4/2025 | Valkaitis | ................... | H04L 9/14 |
| 2010/0293379 A1 * | 11/2010 | Nie | ........................ | H04L 9/3242 |
| | | | | 713/169 |
| 2013/0013931 A1 * | 1/2013 | O'Hare | ................. | H04L 9/3231 |
| | | | | 713/189 |
| 2013/0145440 A1 * | 6/2013 | Adam | ...................... | G06F 21/73 |
| | | | | 726/5 |
| 2015/0195251 A1 * | 7/2015 | Han | ........................ | H04L 63/14 |
| | | | | 713/168 |
| 2016/0026810 A1 * | 1/2016 | Hagiwara | ............... | G06F 21/86 |
| | | | | 713/193 |

(Continued)

*Primary Examiner* — Taghi T Arani
*Assistant Examiner* — Pegah Barzegar
(74) *Attorney, Agent, or Firm* — WOMBLE BOND DICKINSON (US) LLP

(57) ABSTRACT

Methods and systems for managing data are disclosed. An endpoint may rely on access to sensitive data in order to provide computer-implemented services. The sensitive data may be encrypted using a volume master key (VMK). The VMK may be protected by security protocols implemented on the endpoint that may prevent access to the VMK if hardware of the endpoint has failed and/or has been altered. Thus, a hardware failure may result in an indefinite loss of access to the sensitive data. To prevent loss of data access, the VMK may be managed using secure backup and recovery processes. The processes may include multiply encrypting the VMK using key pairs managed by multiple entities, and the decryption keys may be secured in multiple locations. To sequentially decrypt the VMK during the recovery process, security checks may be performed by each entity, and the final decryption may be performed by the endpoint.

20 Claims, 8 Drawing Sheets

400

(56) References Cited

U.S. PATENT DOCUMENTS

| | | | | |
|---|---|---|---|---|
| 2016/0352518 A1* | 12/2016 | Ford | .................... | G06F 21/6218 |
| 2017/0063531 A1* | 3/2017 | Sullivan | .............. | G06F 21/6209 |
| 2018/0176013 A1* | 6/2018 | Cheng | ..................... | G06F 21/64 |
| 2019/0238323 A1* | 8/2019 | Bunch | ................... | H04L 9/0825 |
| 2020/0037156 A1* | 1/2020 | Najmi | ................ | H04W 12/041 |
| 2020/0244454 A1* | 7/2020 | Gupta | .................. | H04L 9/0894 |
| 2020/0344055 A1* | 10/2020 | Topps | .................. | H04L 9/0822 |
| 2021/0218567 A1* | 7/2021 | Richards | .............. | G06F 21/602 |
| 2021/0218722 A1* | 7/2021 | Gaylor | .................. | H04L 9/0894 |
| 2022/0103356 A1* | 3/2022 | Be'Ery | .................... | H04L 9/50 |
| 2022/0173904 A1* | 6/2022 | Kesari | .................. | H04L 9/0894 |
| 2023/0088562 A1* | 3/2023 | Valkaitis | ................... | H04L 9/30 |
| | | | | 713/189 |
| 2023/0098739 A1* | 3/2023 | Valkaitis | .............. | H04L 63/104 |
| | | | | 713/165 |
| 2023/0308287 A1* | 9/2023 | Pettit | ........................ | H04L 9/50 |
| 2023/0403140 A1* | 12/2023 | Valkaitis | .............. | H04L 9/0618 |
| 2024/0223375 A1* | 7/2024 | Tsehori | ................ | H04L 9/0863 |
| 2024/0348426 A1* | 10/2024 | Goodman | ............. | H04L 9/0894 |

* cited by examiner

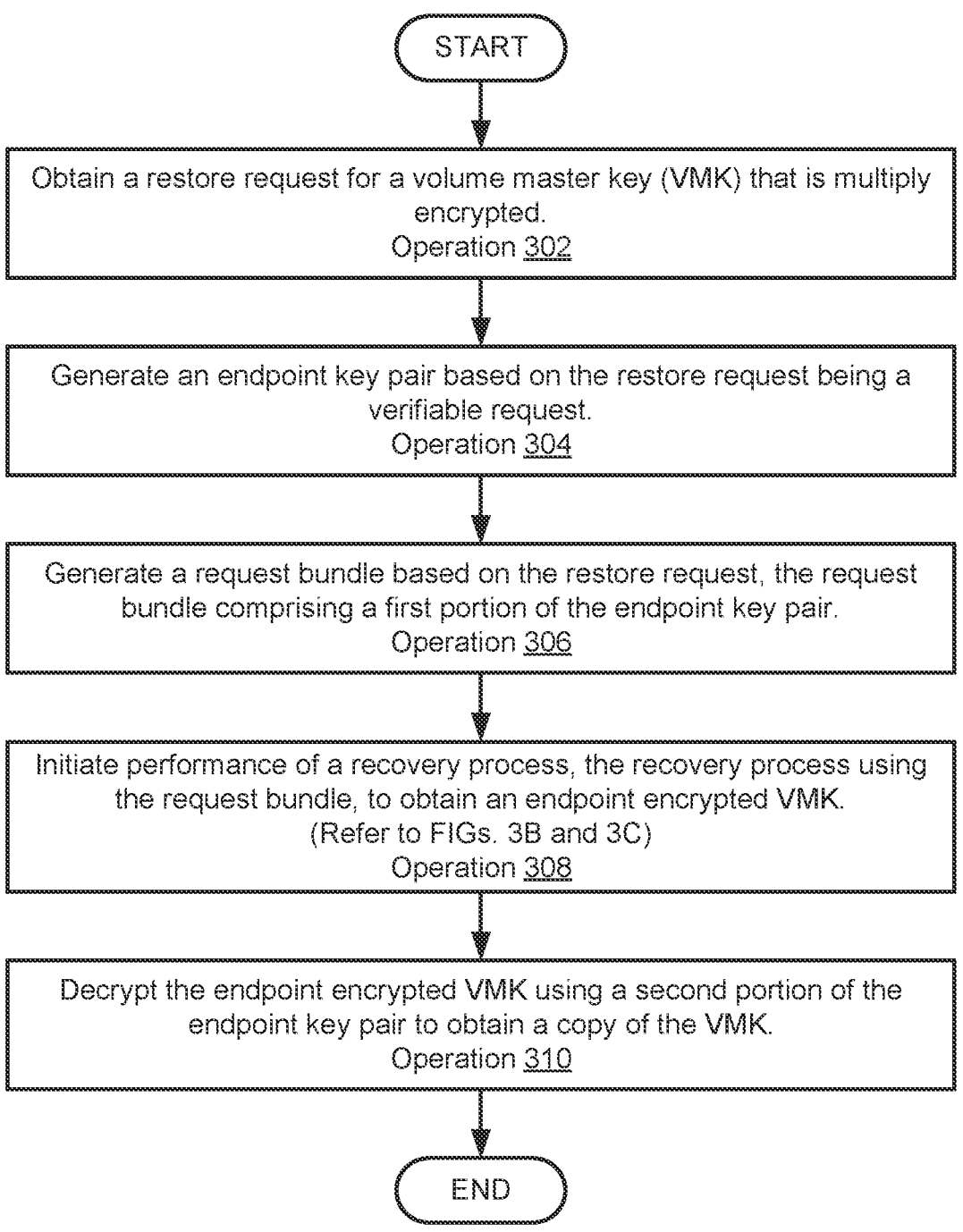

START

Obtain a restore request for a volume master key (VMK) that is multiply encrypted.
Operation 302

Generate an endpoint key pair based on the restore request being a verifiable request.
Operation 304

Generate a request bundle based on the restore request, the request bundle comprising a first portion of the endpoint key pair.
Operation 306

Initiate performance of a recovery process, the recovery process using the request bundle, to obtain an endpoint encrypted VMK.
(Refer to FIGs. 3B and 3C)
Operation 308

Decrypt the endpoint encrypted VMK using a second portion of the endpoint key pair to obtain a copy of the VMK.
Operation 310

END

FIG. 3A

START

Obtain the request bundle and the multiply encrypted volume master key (VMK).
Operation 342

Decrypt a first layer of encryption of the multiply encrypted VMK using a second portion of a receptacle key pair to obtain a singly encrypted VMK.
Operation 344

Provide the singly encrypted VMK and the request bundle to a backup manager.
Operation 346

END

SYSTEM AND METHOD FOR MANAGING THE SECURITY OF SENSITIVE DATA USING MULTIPLE ENCRYPTION

FIELD

Embodiments disclosed herein relate generally to data access management. More particularly, embodiments disclosed herein relate to systems and methods to manage the security of sensitive data.

BACKGROUND

Computing devices may provide computer-implemented services. The computer-implemented services may be used by users of the computing devices and/or devices operably connected to the computing devices. Computing devices may utilize sensitive data when providing computer-implemented services. Computer security measures may be implemented to protect sensitive data while performing the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3C show flow diagrams illustrating a method of managing data in accordance with an embodiment.

DETAILED DESCRIPTION

Figure 1:
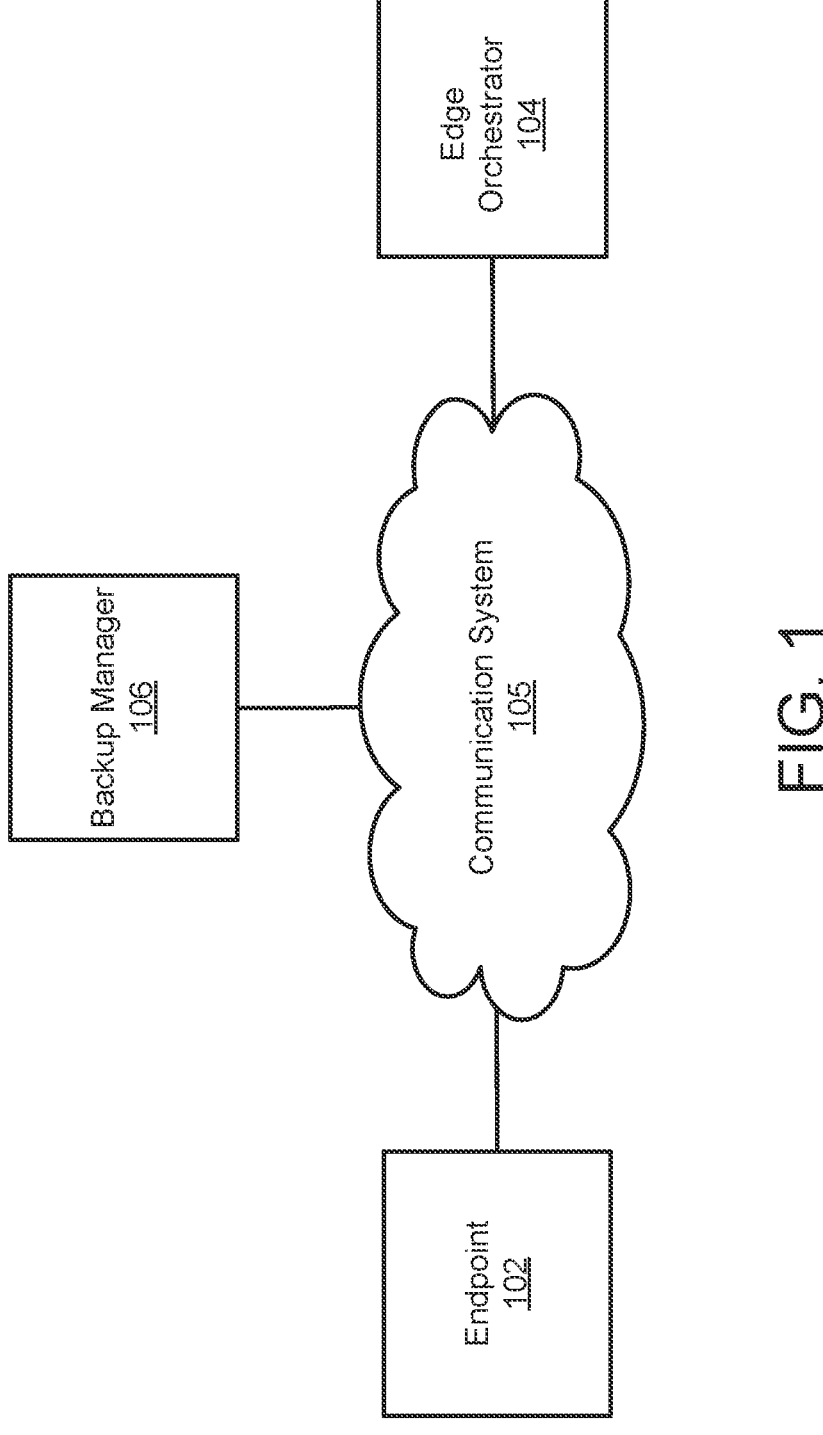
FIG. 1 shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the security of and/or accessibility to sensitive data. In order to provide computer-implemented services, a data processing system may access and/or store data (e.g., sensitive data). Sensitive data may be susceptible to access by malicious parties and/or unauthorized users. The security of sensitive data may depend on data security measures such as disk encryption. For example, the sensitive data (e.g., stored on a disk) may be encrypted using disk encryption software that utilizes disk encryption keys, the keys being stored securely within the data processing system. Decryption of the sensitive data may be initiated by an entity with access to the keys, therefore the keys may also be treated as sensitive data.

In order to secure the keys, hardware-based security measures may be implemented. For example, a trusted platform module (TPM) may be used to store and manage access to the keys for an endpoint (e.g., a data processing system). A user of the endpoint may be permitted to access data stored on the endpoint provided that the TPM deems the system is in an appropriate operating and/or secured state. For example, the user may not have access to the data if any of the components of the endpoint have been tampered with, altered, and/or if critical components of the system are not functional (e.g., have failed).

When the endpoint is considered to be in an appropriate operating and/or secured state, a password (e.g., known only by a specific user with specific privileges and/or authority) may be used to facilitate data access by the user. The data processing system generate the decryption key (e.g., using the password), and/or may have direct access to the decryption key (e.g., stored by the TPM). However, the password may be lost and/or access to the decryption key stored on the endpoint may be prevented due to a component replacement (e.g., the endpoint may be deemed in an unsecured state) and/or a critical component (e.g., a motherboard and/or the TPM) failure. In these cases, access to the decryption keys and/or the sensitive data may be lost indefinitely.

To prevent loss of access to sensitive data (e.g., loss of access to decryption keys), it may be desirable to create backups of disk encryption keys for recovery purposes. However, the backup and recovery of disk encryption keys (e.g., sensitive data) must be secure in order to prevent malicious parties (e.g., or users without the proper level of authority) from intercepting the keys during the backup and/or recovery process.

To do so, a data management framework may be implemented. The framework may manage backup processes and corresponding recovery processes of disk encryption keys. The disk encryption keys (e.g., volume master keys (VMKs)) may not be made available to the user of the endpoint and may require the action of multiple entities (e.g., in different locations) to backup and/or restore the VMK.

The backup process may include multiple layers of encryption to secure a copy of the VMK. That is, the VMK may be multiply encrypted before exposing it to other entities and/or communication channels that may be participating in the data management processes. The keys (e.g., usable to encrypt and/or decrypt the multiply encrypted VMK) may be distributed among the multiple participating entities, preventing any single entity from directly accessing the VMK at any point during the backup and/or recovery processes.

When the secured VMK (e.g., multiply encrypted VMK) is requested by an endpoint, the multiply encrypted VMK may only be accessed (e.g., decrypted) using a decryption sequence that requires each of the participating entities to validate relevant security attestations before performing decryption processes. To maintain security of the VMK during the backup and recovery processes, the VMK may be encrypted by at least one encryption layer as it is transferred between the participating entities, including when the secure VMK is provided to the requesting endpoint.

While various methods are described with respect to securing disk encryption keys (e.g., VMKs), the methods and systems may apply to any type of sensitive data.

By doing so, an improved computing device and/or distributed system may be obtained. The improved device and/or system may provide a management framework for the backup and recovery process of sensitive data. Implementation of the process may prevent loss of access to the sensitive data and/or may reduce the likelihood of malicious parties accessing sensitive data required to provide the computer-implemented services.

In an embodiment, a computer implemented method for managing VMKs is provided. The method may include: obtaining, by an endpoint, a restore request for a VMK of the VMKs that is multiply encrypted and stored remotely to the endpoint, the restore request being initiated by a first user of a first data processing system; and, generating an endpoint key pair based on the restore request being a verifiable request.

The method may also include: generating a request bundle based on the restore request, the request bundle including a first portion of the endpoint key pair, the request bundle lacking decryption keys usable to decrypt the multiply encrypted VMK, and the decryption keys being stored separately and remotely to the endpoint; initiating performance of a recovery process, the recovery process using the request bundle, to obtain an endpoint encrypted VMK; and, decrypting the endpoint encrypted VMK using a second portion of the endpoint key pair to obtain a copy of the VMK.

The recovery process may include: obtaining, by the first data processing system, the request bundle and the multiply encrypted VMK; decrypting, by the first data processing system, a first layer of encryption of the multiply encrypted VMK using a second portion of a receptacle key pair to obtain a singly encrypted VMK, the receptacle key pair being a portion of the decryption keys, and generation of the receptacle key pair being initiated by an administrator; and, providing, by the first data processing system, the singly encrypted VMK and the request bundle to a backup manager, the backup manager maintaining a manager key pair of the decryption keys.

The recovery process may also include: obtaining, by the backup manager and from the first data processing system, the singly encrypted VMK and the request bundle; decrypting, by the backup manager, the singly encrypted VMK using a second portion of the manager key pair to obtain the copy of the VMK; encrypting, by the backup manager, the copy of the VMK using the first portion of the endpoint key pair to obtain the endpoint encrypted VMK; and, providing, by the backup manager, the endpoint encrypted VMK to the endpoint.

The method may further include, prior to obtaining the restore request, initiating, by a second data processing system, performance of a backup process to obtain the multiply encrypted VMK.

The backup process may include: providing, by the second data processing system, a backup request for the VMK to a prior endpoint, the VMK being stored on the prior endpoint, and the backup request being initiated by a second user; and, obtaining, by the second data processing system, the multiply encrypted VMK from the prior endpoint, using a first portion of the manager key pair and a first portion of the receptacle key pair.

The backup process may also include: obtaining, by the prior endpoint, the backup request; encrypting, by the prior endpoint, the VMK using the first portion of the manager key pair to obtain the singly encrypted VMK; and, encrypting, by the prior endpoint, the singly encrypted VMK using the first portion of the receptacle key pair to obtain the multiply encrypted VMK.

The administrator may be authorized to initiate the generation of the receptacle key pair, and the first user and the second user lack authorization to initiate the generation the receptacle key pair. The receptacle key pair may be assigned to the administrator for exclusive use.

The restore request may include a work request for generating the endpoint key pair, the work request being signed by the first user, and permission for generating the endpoint key pair being delegated to the first user. The restore request may also include an attestation indicating that the first user has ownership of the endpoint.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the process.

Turning to FIG. 1, a block diagram illustrating a distributed system in accordance with an embodiment is shown. The system shown in FIG. 1 may provide computer-implemented services. The system may include endpoint 102, edge orchestrator 104, and backup manager 106. While illustrated with an edge orchestrator it will be appreciated that any type of management plane may be used. Endpoint 102 may include a data processing system that may independently and/or cooperatively (e.g., with other endpoints, not shown) provide the computer-implemented services.

For example, endpoint 102 may provide computer-implemented services to users and/or other computing devices operably connected to endpoint 102. The computer-implemented services may include any type and quantity of services including, for example, database services, instant messaging services, video conferencing services, etc. Different systems may provide similar and/or different computer-implemented services.

When providing the computer-implemented services, endpoint 102 may obtain, generate, and/or store data (e.g., sensitive data). Endpoint 102 and components thereof, as well as hosted entities (e.g., applications that provide computer-implemented services, other applications that manage the operation of endpoint 102, etc.), may be subject to attacks performed by malicious parties. For example, a malicious party may gain access to endpoint 102 (e.g., via physical access). If the malicious party gains access to endpoint 102, the malicious party may gain access to data stored locally on endpoint 102.

Thus, to secure the data hosted by endpoint 102 against physical attacks, the data may be encrypted (e.g., using disk encryption). In order to access the secure data (i.e., encrypted data), the data may be decrypted using one or more decryption keys unknown to malicious parties (e.g., private keys). For example, a storage disk for a data processing system (e.g., endpoint 102) may be encrypted using a VMK.

The decryption keys (e.g., VMKs) may be accessed, for example, using password-based encryption key derivation function methods (e.g., the decryption key may be generated based on a user-supplied password) and/or using hardware-based security. For example, a trusted platform module (TPM) may control access to stored decryption keys. However, if decryption key recovery methods fail, then access to the encrypted data (e.g., stored on endpoint 102) may be lost. For example, passwords may be lost (e.g., forgotten) and/or critical hardware components (e.g., a motherboard and/or the TPM) may fail, resulting in a loss of access to the secured (e.g., encrypted) data.

To avoid loss of access to encrypted data, the decryption keys may be backed up and/or stored remotely to endpoint 102. However, malicious parties may attempt to gain access to the stored backups, and/or the security of the decryption keys may be compromised in transit (e.g., between an endpoint and a remote storage location).

In general, embodiments disclosed herein may provide systems, devices, and methods for managing the security of sensitive data by implementing a framework for managing the backup and/or storage of disk encryption keys (e.g., VMKs). The management framework may allow for VMKs and/or other sensitive data to be managed (e.g., backed up and/or restored) in a secure manner. The management framework may use a combination of (i) encryption, and (ii) enforced hygiene standards for the VMKs.

For example, the framework may include multiply encrypting the VMKs using cryptographic keys generated and/or stored by multiple separate entities authorized to do so. The multiple separate entities may perform security checks (e.g., security attestations) before authorizing the decryption of the one or more layers of a multiply encrypted VMK.

The hygiene standards may (i) ensure that encrypted VMKs can never be fully decrypted while at rest by a single entity, (ii) require that all communications are presumed to be over insecure mediums, (iii) require that participants in encryption and decryption of VMKs meet certain security postures and identities, (iv) require that VMKs never be made available to owners, and/or (v) require that request for invocations of functions related to encryption and decryption of VMKs be cryptographically verified to roots of trust prior to performance of the functions.

By doing so, sensitive data (e.g., the VMKs and/or data that may be decrypted using the VMKs) may be less likely to be divulged to malicious parties by virtue of the multiple layers of encryption, the associated decryption keys being stored in multiple locations remote to the endpoint, and enforced hygiene standards. Additionally, if access to a locally stored VMK is lost (e.g., if endpoint component hardware has failed and/or has been altered), then access to the encrypted data may be maintained by restoring a backup copy of the VMK.

To provide its functionality, endpoint 102 may (i) generate and/or store data (e.g., sensitive data), (ii) encrypt the data using a VMK for endpoint 102, and/or (iii) participate in backup and/or recovery processes of the VMK. While participating in the backup and/or recovery processes, endpoint 102 (or other endpoints) may perform the operations described with respect to FIGS. 2A-2C.

Edge orchestrator 104 may participate in the backing up of VMKs from endpoint 102, and/or in the recovery of VMKs for endpoint 102 and/or other endpoints. Edge orchestrator 104 may participate in the backup and/or recovery processes (e.g., of VMKs) by (i) validating user requests (e.g., backup requests, restore requests, and/or encryption key generation requests), (ii) storing copies of the multiply encrypted VMKs, and/or (iii) performing encryption and/or decryption processes (e.g., for VMKs), and/or (iv) performing other actions to facilitate the backup and/or recovery processes for VMKs.

While providing backup and/or restore functionality, backup manager 106 may (i) store copies of the multiply encrypted VMKs (e.g., secure backups of the VMKs), (ii) perform decryption and/or re-encryption of VMKs (e.g., using cryptographic keys stored by backup manager 106 and/or received from endpoint 102), and/or (iii) perform other actions to facilitate the backup and/or recovery processes for VMKs. Backup manager 106 may be a trusted third party (e.g., a vendor and/or manufacturer).

Figure 3B:
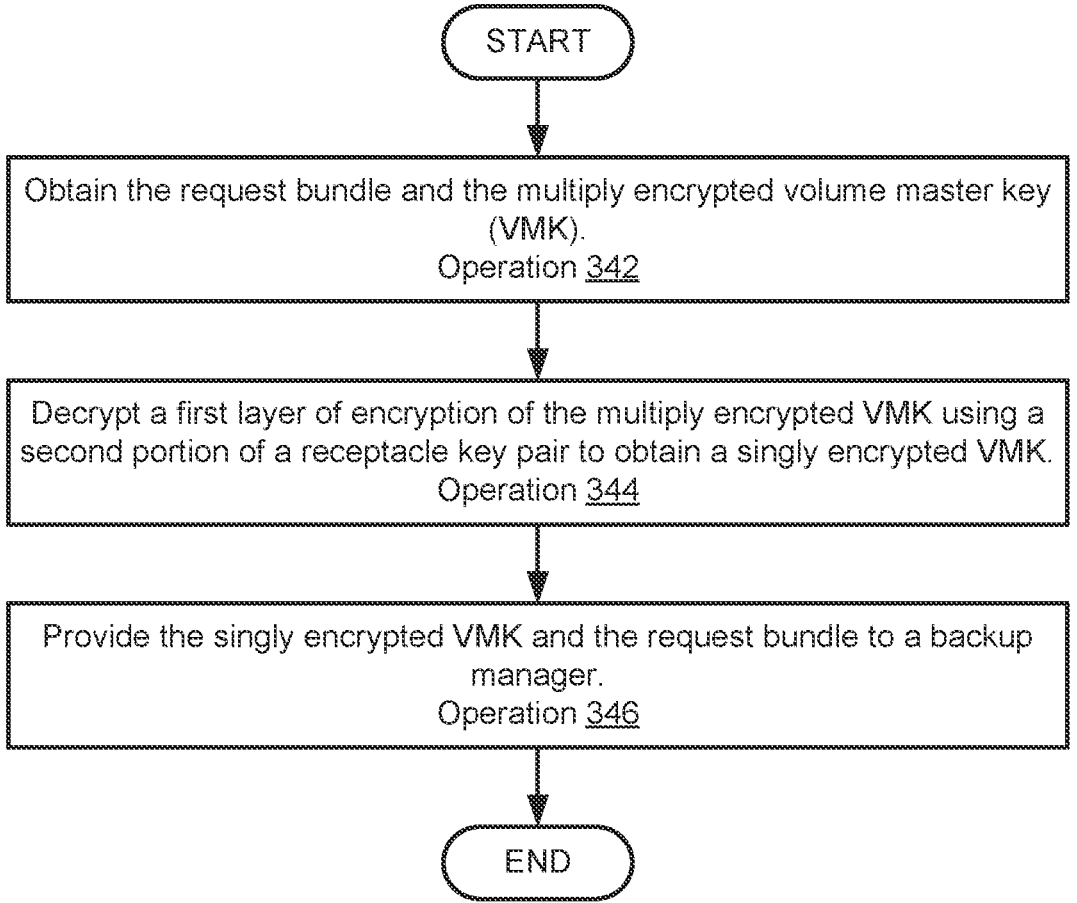
Figure 3C:
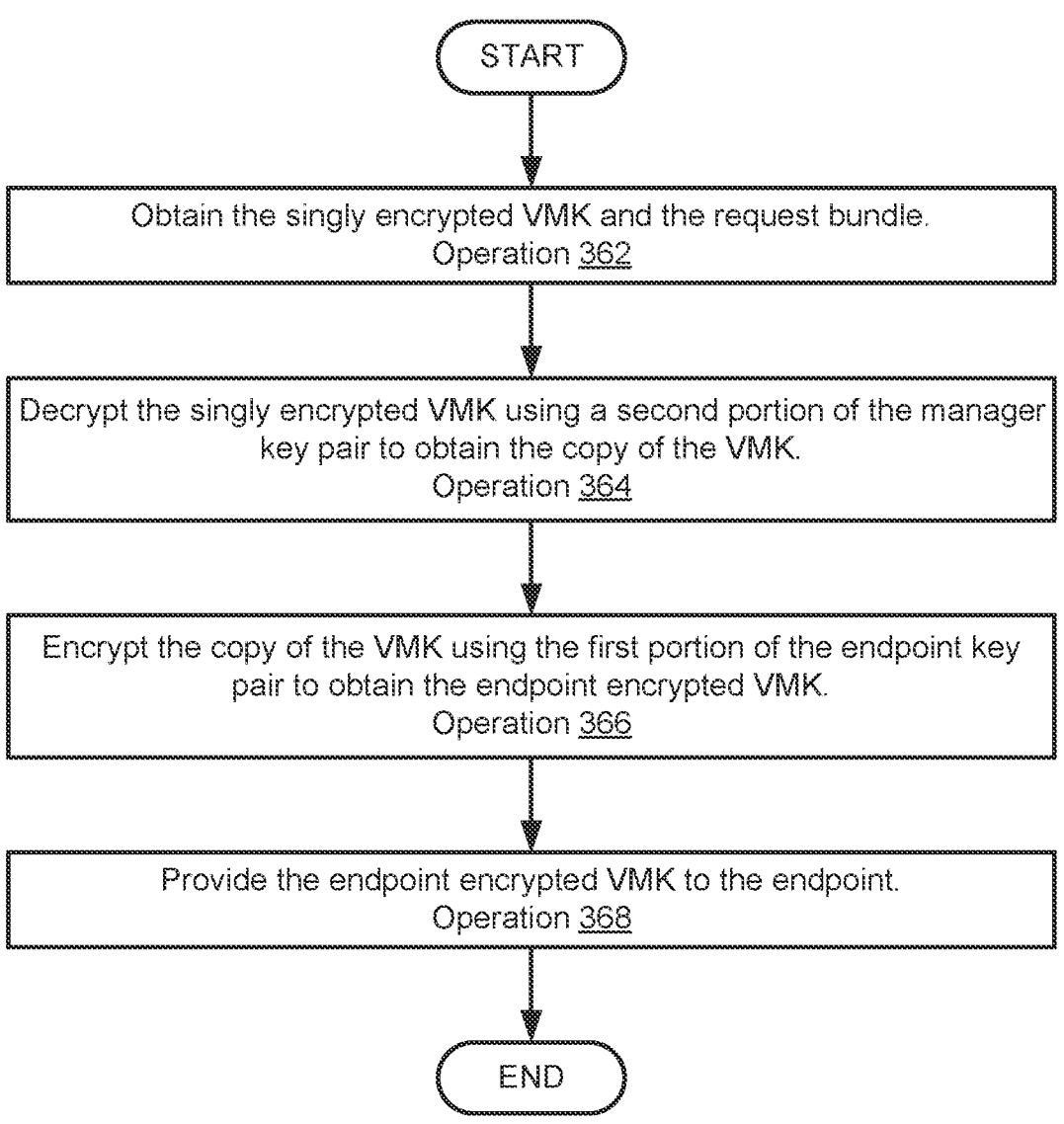

When providing its functionality, endpoint 102 may perform all, or a portion, of the method and/or actions shown in FIGS. 3A-3C.

Endpoint 102, edge orchestrator 104, and/or backup manager 106 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
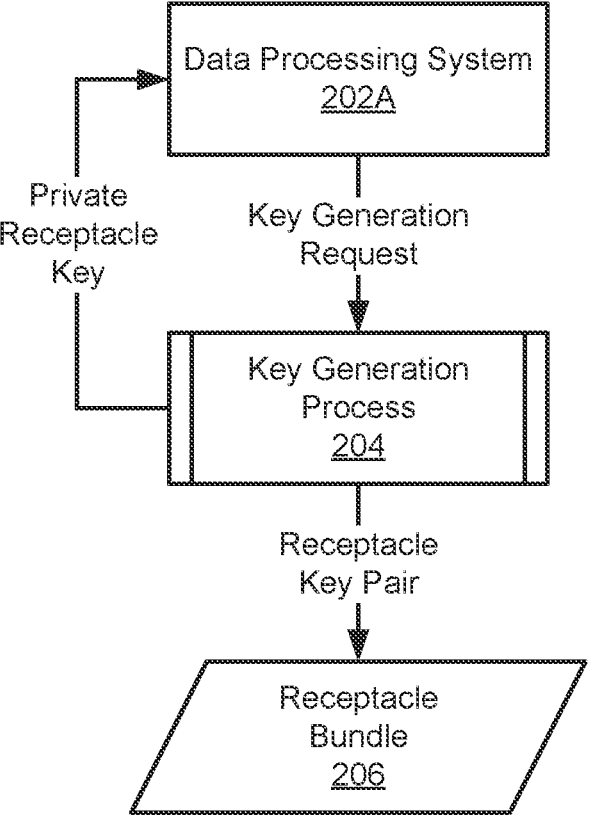
FIG. 2A shows a data flow diagram illustrating a process of generating a receptacle bundle in accordance with an embodiment.

Turning to FIG. 2A, a first data flow diagram in accordance with an embodiment is shown. The data flow diagram may illustrate a process of generating receptacle bundle 206 and may be performed by a system similar to that of FIG. 1. Receptacle bundle 206 may be generated as part of the hygiene rules to facilitate encryption of VMKs, to which requestors of backups do not have access. Receptacle bundle 206 may authorize VMK backups to be generated using a key pair (e.g., a "receptacle key pair") for a director or other person that does not request generation of a backup of the VMK. Consequently, when a VMK is generated in accordance with the limited authorization provided by the receptacle bundle and responsive to a request from a user of the endpoint, the encrypted VMK may not be decrypted by the requestor.

To obtain receptacle bundle 206, a user (e.g., the director) operating data processing system 202A may initiate a key generation request, and/or the request may be initiated by an automatic process.

The user may be a privileged user (e.g., the user may be the administrator) holding a high level of permission authority that may be required to initiate the key generation request. The key generation request may include (i) information regarding the requesting user (e.g., a user identifier), (ii) information regarding the device of the requesting user (e.g., an identifier of data processing system 202A), (iii) information regarding the requested key pair type (e.g., an identifier that may indicate future implementations of the keys), (iv) information regarding the requested action (e.g., to generate receptacle key pair), and/or (v) other types of request information. The key generation request may be approved upon validation of a certificate of permissions (e.g., signed by the master estate key) during key generation process 204.

For example, key generation process 204 may verify the certificates of permissions for the director in order to validate that the initiating user (e.g., the administrator) has authority to generate a specific key type (e.g., a key to encrypt backup data) for a specific resource (e.g., an endpoint) and purpose (e.g., VMK backup). The certificate of permissions may be stored on data processing system 202A and/or in a location accessible to the edge orchestrator 104. The validation process may include verifying a chain of signed certificates in order to authorize key generation. Key generation process 204 may generate an asymmetric (e.g., a public key and corresponding private key) key pair and the key pair may be referred to as the receptacle key pair.

Figure 2B:
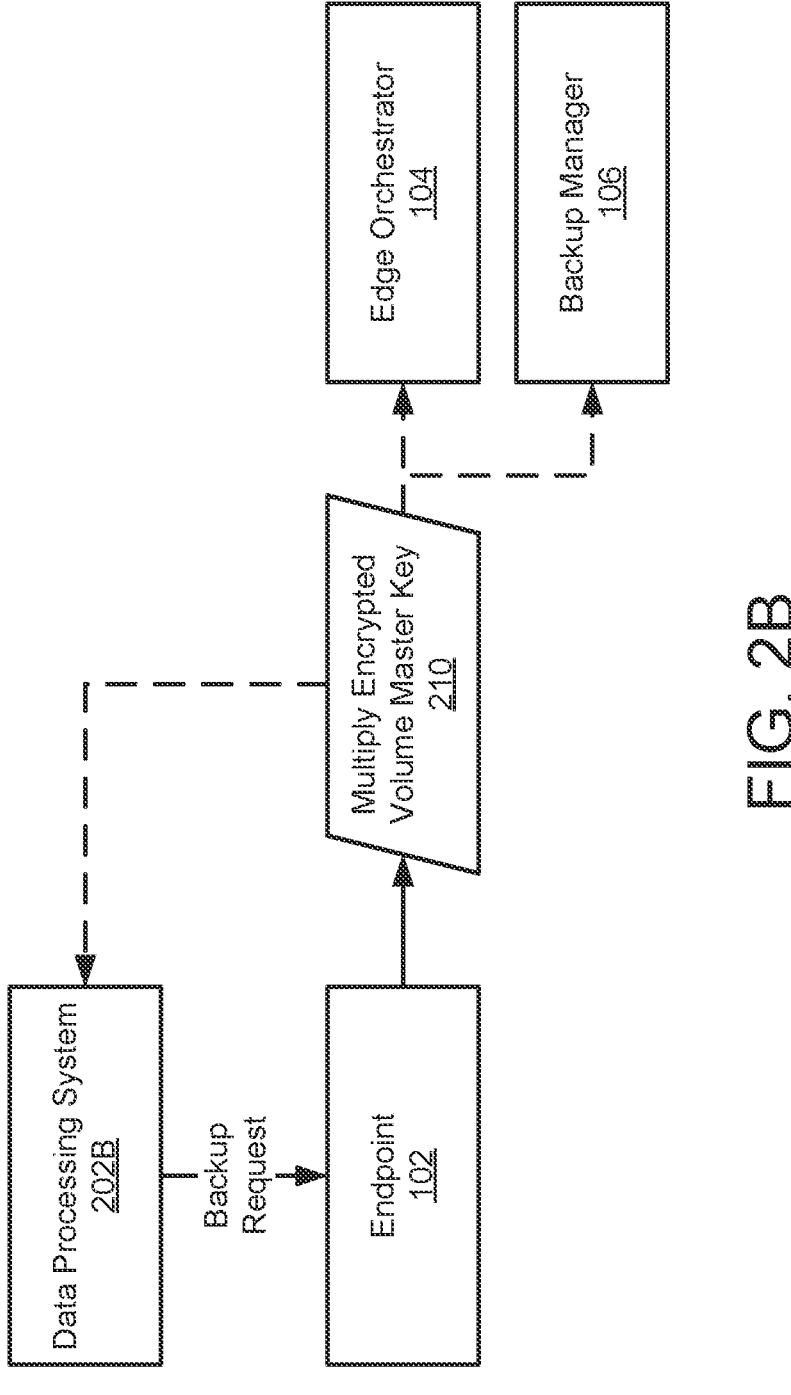
FIG. 2B shows a data flow diagram illustrating a process of backing up data in accordance with an embodiment.

The receptacle key pair may be used to encrypt one or more layers of data during a backup process (discussed further with respect to FIG. 2B). Consequently, a portion of the receptacle key pair (e.g., the private receptacle key) may be required to decrypt the data during a recovery process (discussed further with respect to FIG. 2C). Thus, the private receptacle key may be secured and/or retained by (i) storing the key in a secure location (e.g., accessible by the trusted entity that initiated the key pair generation, such as data processing system 202A), (ii) creating key backups (e.g., manually and/or through automatic retention processes), and/or (iii) via other retention methods and/or measures. To access the private receptacle key (e.g., during the recovery process), a trusted entity (e.g., the administrator), may cause the key to be available for decryption.

During key generation process 204, a signed attestation may be generated, the signed attestation indicating that the generated encryption key pair (e.g., the receptacle key pair) is associated with the requesting user (e.g., the administrator) and is authorized for a specific scope of use (e.g., securing backups for a specific resource and operation). For example, the attestation may be signed by the administrator to attest that the public key is an authorized receptacle key and that the entity holding the corresponding private key is authorized to decrypt data that is encrypted with the public key. If the attestation is validated, then the public key may be used to securely encrypt a copy of a VMK of a specific endpoint for backup purposes. Consequently, a user of an endpoint may request that a VMK be encrypted using the public key resulting in an encrypted VMK being generated that the user may not be able to decrypt using the keys available to the user.

Key generation process 204 may generate receptacle bundle 206. Receptacle bundle 206 may include certificates of permissions and/or attestations (e.g., including the public receptacle key). The certificates of permissions may be signed by a trusted entity (e.g., a master estate key). Receptacle bundle 206 may be stored in multiple locations (e.g., may be widely distributed) to be used as part of one or more backup processes.

Any number of receptacle bundles (e.g., receptacle key pairs) may be generated and/or distributed for any types of purposes during the receptacle key generation process 204.

Thus, as illustrated in FIG. 2A, the system of FIG. 1 may generate receptacle key pairs and related security information (e.g., receptacle bundles) that may be used to securely backup data. Information from the receptacle bundle may be used to validate the authenticity of the public receptacle key before using the key to encrypt sensitive data.

Turning to FIG. 2B, a second data flow diagram in accordance with an embodiment is shown. The data flow diagram may illustrate a process of backing up data. An entity (e.g., a user of data processing system 202B) and/or automated agent may initiate a backup process. The user, entity, and/or automated agent initiating the backup process may hold a lower level (or different level) of permissions than the user, entity and/or automated agent (e.g., the administrator) that has authority to initiate receptacle key generation. Initiation of the backup process may cause a backup request to be generated (e.g., by data processing system 202B).

The backup request may include a work request and/or a receptacle bundle (discussed with respect to FIG. 2A). The work request may include (i) information regarding the requesting user (e.g., a user identifier), (ii) information regarding the target resource (e.g., an endpoint identifier), (iii) information regarding the requested action (e.g., perform a backup of a VMK), and/or (iv) other types of request information.

The backup request may be provided to endpoint 102 (e.g., or another target resource), which may store the target data (e.g., the data intended to be backed up). The target data may be a VMK. The backup request may be provided to endpoint 102 through an edge orchestrator. The edge orchestrator and/or endpoint 102 may verify that the work request is authorized by validating information from the work request and/or the receptacle bundle. The validation may assert that the user holds the proper authority to initiate performance of the backup request using information provided in the receptacle bundle (e.g., the public receptacle key).

After the backup request is validated, endpoint 102 may encrypt a copy of the target data using one or more encryption keys (e.g., in a specific order) accessible to endpoint 102 (e.g., already stored on and/or obtained by endpoint 102). The encrypted result may be a secure (e.g., multiply encrypted) backup copy of the target data. Consequently, the resulting encrypted data may meet hygiene rules for backup generation.

For example, a VMK backup request for endpoint 102 may be initiated by a user of data processing system 202B. Once the backup request is validated, endpoint 102 may encrypt the VMK (e.g., which may have been generated by endpoint 102 upon initial boot by a user thereof). The encryption keys used to encrypt the VMK may include the public key of a manufacturer of the system and/or a trusted entity such as backup manager 106, and/or the public receptacle key included in the receptacle bundle.

The public key of backup manager 106, the public "manager key" (e.g., baked into the operating system image of endpoint 102 and/or otherwise validated using a key authority, not shown, that publishes validated keys for various entities) may be used to generate the first layer of encryption of the VMK. Then, the public receptacle key may be used to generate the second layer of encryption of the VMK, resulting in multiply encrypted VMK 210.

Multiply encrypted VMK 210 (e.g., along with security information such as attestations, cryptographic hashes, digital signatures, etc.) may be (i) provided to a system operated by the requesting user (e.g., data processing system 202B), (ii) stored within the management plane (e.g., via edge orchestrator 104), (iii) made available to a service provider to store (e.g., backup manager 106), and/or (iv) stored in other locations (e.g., accessible to systems that may participate in the restore process).

Thus, as illustrated in FIG. 2B, the system of FIG. 1 may perform a secure backup process for sensitive data (e.g., VMKs) by multiply encrypting the data before making the secure data available to one or more backup storage locations. By providing access to secured backups of VMKs, the likelihood losing access to data (e.g., data stored on a disk encrypted using the system's VMK) may be reduced. Additionally, the secure nature of the VMK backups reduces the likelihood of the VMKs (e.g., and data secured using the VMKs) being obtained and/or otherwise used by malicious parties.

Figure 2C:
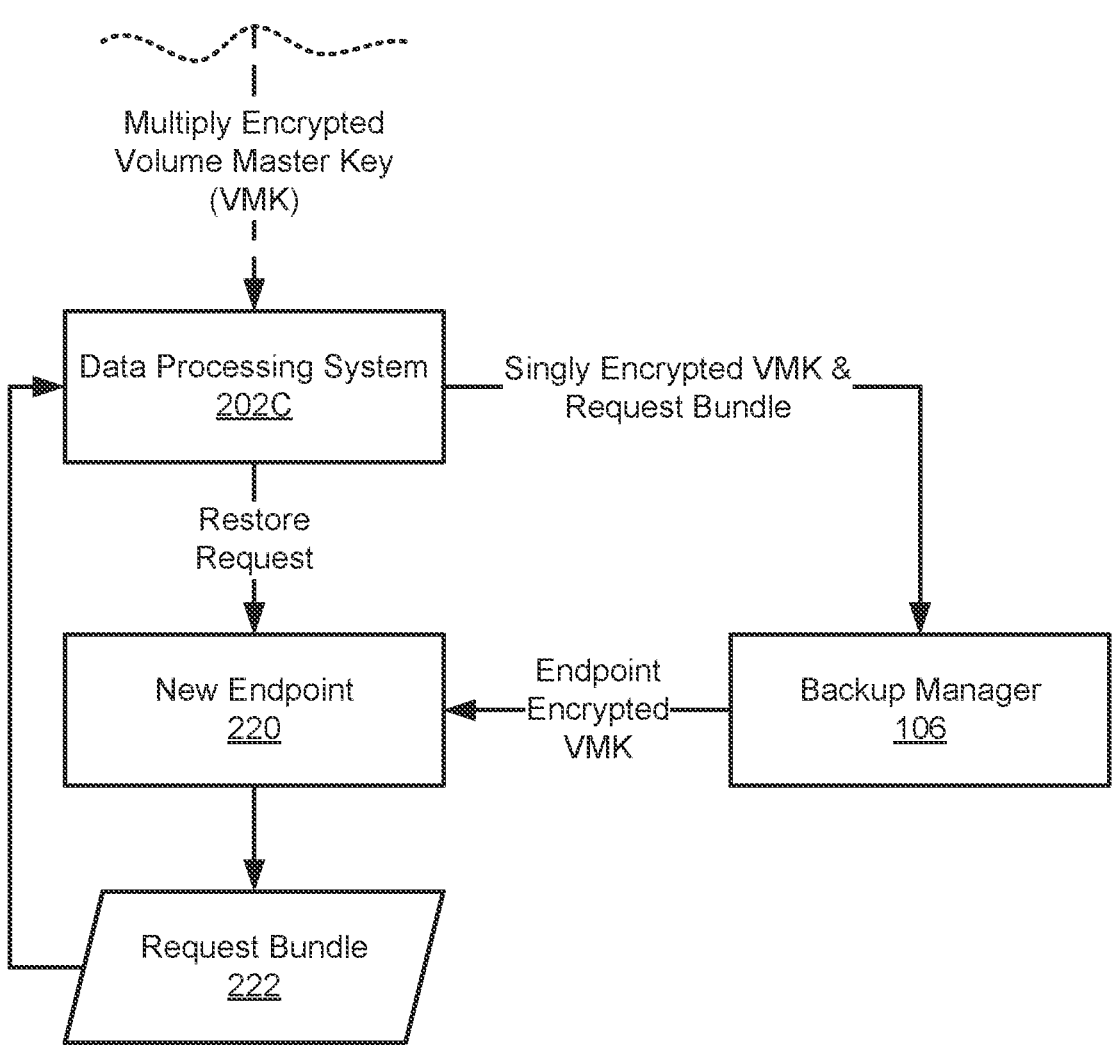
FIG. 2C shows a data flow diagram illustrating a process of recovering data in accordance with an embodiment.

Turning to FIG. 2C, a third data flow diagram in accordance with an embodiment is shown. The data flow diagram may illustrate a process of recovering data. For example, sensitive data such as VMKs may be restored when access to the original VMKs is lost.

Access may be lost, for example, due to one or more component failures of a data processing system (e.g., a motherboard, TPM, etc.), prompting replacement of the components, and/or the transfer of storage disks to a new system. This may result in the data processing system being without access to the VMK, or the new data processing system without access to the appropriate VMK (e.g., usable to decrypt the data stored on the transferred storage disks). Loss of access to the VMK may render the computer-implemented services (e.g., that rely on accessing data stored on the storage disks of the data processing system) unavailable. Thus, the VMK (e.g., of a fully or partially failed data processing system) may be restored from backup in order to prevent loss of data access and to avoid interruption to the provided computer-implemented services.

A user operating data processing system 202C may initiate a recovery process (e.g., for a VMK), prompting data processing system 202C to generate a restore request. The restore request may include a work request signed by the requesting user and/or the master estate key (e.g., to ensure the restore request is verifiable and not tampered with during transfer). The restore request and/or the work request may include (i) information regarding the requesting user (e.g., a user identifier), (ii) information regarding the target resource (e.g., an endpoint identifier), (iii) information regarding the requested action (e.g., to generate endpoint key pairs and/or restore a VMK), and/or (iv) other types of request information.

The restore request may be provided to new endpoint 220 (e.g., or another data processing system such as endpoint 102, depending on the reason for the restore request) through orchestration architecture. An edge orchestrator may validate the restore request based on certificates of permission authorizing the requesting user to initiate performance of the requested action (e.g., VMK recovery) for a specific device (e.g., endpoint 102).

New endpoint 220 may obtain and/or validate the restore request. Once validated, new endpoint 220 may generate endpoint keys (e.g., asymmetric encryption keys stored on new endpoint 220 that may be used later in the recovery process). New endpoint 220 may also generate request bundle 222, which may include the generated public endpoint key, security information signed by the master estate key (e.g., an attestation relating new endpoint 220 with its device attestation key (DAK)), and/or the work request.

Request bundle 222 may be signed with the DAK (e.g., a well-known key that may indicate new endpoint 220 is operating in a secured state).

Signed request bundle 222 may be provided to the initiator (e.g., data processing system 202C), and/or an agent thereof (e.g., edge orchestrator 104 or other management plane). Data processing system 202C may obtain request bundle 222 and a multiply encrypted VMK (e.g., from storage via edge orchestrator 104, backup manager 106, and/or any other location where the multiply encrypted VMK may be stored). The multiply encrypted VMK may be decrypted (e.g., layer by layer) by each of the multiple entities with access to each of the multiple decryption keys.

Before decrypting the first (e.g., outer) layer of the multiply encrypted VMK, the management plane software and/or a user (e.g., an administrator) may perform security checks of the attestations included in request bundle 222 in order to validate that the requesting user is authorized to initiate the recovery process. Once the restore request is validated, data processing system 202C may perform the decryption of the outer layer of the multiply encrypted VMK using the private receptacle key. If the requesting user is not the administrator, access to the private receptacle key may be provided at least temporarily to facilitate the decryption, or the multiply encrypted VMK may be temporarily migrated to a system which has access to the private receptacle key.

Once the outer layer of the VMK is decrypted, the now singly encrypted VMK (e.g., still encrypted with the public manager key), request bundle 222, and a certificate of permission (e.g., authorizing the requesting user to initiate the recovery process for new endpoint 220) may be bundled and signed by the DAK. This new bundle may be provided to backup manager 106 (e.g., or another trusted third party with access to the private manager key).

Backup manager 106 may validate the obtained attestations (e.g., in order to prove the restore request is authorized and to verify other parameters of the restore request). Backup manager 106 may decrypt the remaining single layer of encryption (e.g., using its private key, with the public key being used by endpoint 102 to apply one layer of encryption) before immediately re-encrypting the VMK with the public endpoint key (e.g., provided by new endpoint 220 as part of request bundle 222). This decryption/re-encryption process may generate an endpoint encrypted VMK (e.g., a VMK encrypted with the public endpoint key) thereby complying with the hygiene rules regarding encryption at rest.

During the brief period of time between decryption and re-encryption of the VMK, the exposed VMK may exist in the memory of a data processing system used by backup manager 106 to perform the decryption/re-encryption process. To mitigate risk of exposure, the decryption/re-encryption process may use various types of security protocols, such as (i) running the decryption/re-encryption process in a completely stateless manner, (ii) performing the decryption while the system is air-gapped, (iii) utilizing encrypted memory, and/or (iv) overwriting memory used by the decryption/re-encryption process after the decryption/re-encryption process has been completed.

The endpoint encrypted VMK, certificate of permissions, and/or work request may be provided to new endpoint 220, where the certificate of permissions and/or work request may be validated by new endpoint 220. Once validated, new endpoint 220 may use the private endpoint key (e.g., stored thereon) to decrypt the endpoint encrypted VMK to obtain a copy of the VMK.

Thus, as illustrated in FIG. 2C, the system of FIG. 1 may perform a secure recovery process for sensitive data (e.g., VMKs) in cases where access to the original VMK is lost (e.g., due to hardware failure and/or replacement). With the ability to securely recover VMKs from backup, loss of data access may be mitigated and/or prevented without compromising the security of VMKs (e.g., or data encrypted using the VMKs). The recovery process may offer improved security for retrieving the VMKs from backup by virtue of the decryption keys being held by multiple separate entities, each with the ability to perform security checks before authorizing a decryption process. This secure process may reduce the likelihood of the VMKs being intercepted by malicious parties during the recovery process.

As discussed above, the components of FIG. 1 may perform methods to manage access to sensitive data used by data processing systems that provide computer-implemented services.

Turning to FIGS. 3A-3C, flow diagrams illustrating methods of managing data in accordance with an embodiment are shown. The methods may be performed by any of endpoint 102, edge orchestrator 104, backup manager 106, and/or any other components of the system shown in FIG. 1. Any of the operations described with respect to FIGS. 3A-3C may be performed in different orders, skipped, repeated, and/or be performed in a parallel or partially overlapping in time manner.

Turning to FIG. 3A, at operation 302, a restore request for a VMK that is multiply encrypted and stored remotely to an endpoint may be obtained by the endpoint. The restore request may be obtained by receiving the request from a first data processing system, (e.g., initiated by a first user of the first data processing system). The restore request may include security information relating to the restore request. The security information may include an attestation (e.g., indicating that the first user has ownership of the endpoint), and/or a work request for generating an endpoint key pair. The first user may have permission (e.g., authority delegated to the first user) for generating the endpoint key pair, and/or the work request may be signed by the first user.

The restore request may be sent through and/or managed by an edge orchestrator or other management plane. The edge orchestrator may verify and/or validate the security information (e.g., the attestation and/or the work request may be signed with a master estate key) before making the restore request available to the endpoint.

Prior to obtaining the restore request, a second user of a second data processing system may initiate performance of a backup process in order to obtain the multiply encrypted VMK. As part of the backup process, a backup request may be provided to a prior endpoint (e.g., an endpoint storing and/or having access to the VMK) from the second data processing system.

Prior to initiation of the backup request by the second user, a receptacle key pair may be generated. The receptacle key pair generation may be initiated by a user with a level of authority to do so (e.g., an administrator with higher levels of authority than the first user and the second user). The receptacle key pair may be assigned to the user that initiated the generation (e.g., the administrator) for exclusive use. Refer to FIG. 2A for more details regarding receptacle key generation.

Returning to the backup request, the prior endpoint may obtain the backup request from the second data processing system The backup request may include a work request, the public receptacle key, and/or security information relevant to the backup request. Upon validation of the security information, the prior endpoint may perform an encryption process. The VMK may be encrypted multiple times, first using a first portion of the manager key pair (e.g., the public manager key already stored on the endpoint by the manufacturer and/or vendor), and again, using a first portion of the receptacle key pair (e.g., the public receptacle key). The multiple processes of encryption of the VMK may generate a multiply encrypted VMK.

The multiply encrypted VMK may be stored in a location accessible to data processing systems participating in a future recovery process (e.g., by a management plane and/or a third party). Refer to the process described with respect to FIGS. 2A-2B for more information regarding backup processes.

At operation 304, an endpoint key pair may be generated based on the restore request being a verifiable request. The endpoint key pair may be generated by the endpoint using a key generation algorithm (e.g., Rivest-Shamir-Adleman, Digital Signature Algorithm, elliptical curve cryptography, etc.) that pairs a public endpoint key with an associated private endpoint key. The endpoint key pair may be generated after the restore request has been verified by the endpoint (e.g., by validating the security information regarding the restore request). The private endpoint key may be stored securely on the endpoint, while the public endpoint key may be made available to other devices and/or systems as part of the secure recovery process.

At operation 306, a request bundle may be generated based on the restore request. The request bundle may be generated by collecting and grouping the work request, the public endpoint key (e.g., a certificate thereof), and an attestation (e.g., that proves the DAK of the endpoint is valid). The request bundle may be signed by the DAK of the endpoint so that the request bundle (e.g., and contents thereof) may be verified by a receiving entity.

As stated, the request bundle may include a first portion of the endpoint key pair (e.g., the public endpoint key). However, the request bundle may lack the decryption keys usable to decrypt the multiply encrypted VMK, in order to maintain the security of the VMK during the recovery process (e.g., while in transit between systems). Rather, the decryption keys may be stored separately and remotely to the endpoint to prevent storing all information required to expose the VMK in a single location, thereby increasing the security of the VMK during the recovery process.

At operation 308, performance of a recovery process may be initiated. Performance may be initiated by sending the request bundle to a data processing system (e.g., the first data processing system operated by the first user). Performance of the restoration may be initiated via the methods illustrated in FIGS. 3B-3C. Once initiated, the recovery process may generate an endpoint encrypted VMK.

At operation 310, the endpoint encrypted VMK may be decrypted to obtain a copy of the VMK. The endpoint encrypted VMK may be decrypted by initiating (e.g., by a user of the endpoint) a decryption process performed by the endpoint. The decryption process may use a second portion of the endpoint key pair (e.g., the private endpoint key) that may be stored securely on the endpoint. The restored copy of the VMK may be stored securely on the endpoint (e.g., under management of the TPM of the endpoint).

The method may end following operation 310.

Once obtained, the VMK may be used, for example, to restore access to information. For example, the VMK may have been previously used to secure data. The copy of the VMK may be used to restore access to the information, thereby allowing computer-implemented services that depend on the data to be resumed.

Turning to FIG. 3B, operations 342-346 may be a first expansion of operation 308.

At operation 342, the request bundle and the multiply encrypted VMK may be obtained by the first data processing system. The request bundle may be obtained by receiving the request bundle from the endpoint. The multiply encrypted VMK may be obtained by (i) receiving the multiply encrypted VMK from one or more data processing systems (e.g., which may have access to stored copies of the multiply encrypted VMK), (ii) reading the multiply encrypted VMK from storage, and/or (iii) receiving the multiply encrypted VMK from another device (e.g., via an edge orchestrator and/or a third party such as a backup manager). The multiply encrypted VMK may be obtained via network communications between the endpoint and other devices.

At operation 344, a first layer of encryption of the multiply encrypted VMK may be decrypted by the first data processing system. The first layer may be decrypted by performing a decryption process using a second portion of a receptacle key pair (e.g., the private receptacle key). That is, the receptacle key pair may be a portion of the decryption keys.

As previously mentioned, generation of the receptacle key pair may be initiated by the administrator prior to the backup request, and/or the administrator may manage the security of the second portion of the receptacle key (e.g., the private receptacle key). Thus, the administrator may perform actions (e.g., after validation of relevant security information) to provide access to the second portion of the receptacle key pair in order to perform the decryption process. The decryption process may remove one layer of encryption from the multiply encrypted VMK to produce a singly encrypted VMK.

At operation 346, the singly encrypted VMK and the request bundle may be provided to a backup manager. The singly encrypted VMK and the request bundle may be provided by transferring the singly encrypted VMK and the request bundle over a communication channel to the backup manager. The request bundle may include the work request, the public endpoint key (e.g., a certificate thereof), an attestation (e.g., that proves the DAK of the endpoint is valid), and a certificate of permission (e.g., to verify the user's authority to initiate the recovery process). The request bundle may be signed by the DAK of the endpoint so that the request bundle (e.g., and contents thereof) may be verified by the backup manager.

The method may end following operation 346.

Turning to FIG. 3C, operations 362-364 may be a second expansion of operation 308, and may be performed following operation 346 of FIG. 3B.

At operation 362, the singly encrypted VMK and the request bundle may be obtained by the backup manager. The singly encrypted VMK and the request bundle may be obtained by receiving the singly encrypted VMK and the request bundle from the first data processing system. The backup manager may maintain (e.g., securely store and/or have access to) the manager key of the decryption keys.

At operation 364, the singly encrypted VMK may be decrypted by the backup manager. The singly encrypted VMK may be decrypted by performing a decryption process using a second portion of the manager key pair (e.g., the private manager key). The decryption process may be performed after the verification and/or validation of relevant security information from the request bundle. The decryption process performed by the backup manager may remove the remaining layer of encryption from the singly encrypted VMK to produce a copy of the VMK. Immediately after decrypting the remaining layer of encryption from the singly encrypted VMK, the backup manager may re-encrypt the copy of the VMK in order to secure it. The decryption/re-encryption process may implement various security protocols in order to prevent exposure of the VMK during this process.

At operation 366, the copy of the VMK may be encrypted by the backup manager. The copy of the VMK may be encrypted by performing an encryption process. The encryption process may be part of the decryption process outlined in operation 364. The encryption process may use the first portion of the endpoint key pair (e.g., the public endpoint key, included in the request bundle) in order to secure the VMK, producing the endpoint encrypted VMK. Refer to FIG. 2C for details regarding details of the decryption/re-encryption process.

At operation 368, the endpoint encrypted VMK may be provided to the endpoint by the backup manager. The endpoint encrypted VMK may be provided by transferring the endpoint encrypted VMK over a communication channel to the endpoint. Once the endpoint encrypted VMK is provided to the endpoint, the endpoint may decrypt the encrypted VMK. Refer to operation 310 of FIG. 3A for details regarding the decryption of the endpoint encrypted VMK.

The method may end following operation 368.

Thus, as illustrated above, embodiments disclosed herein may provide systems and methods usable to manage the backup and recovery of sensitive data. By distributing the decryption keys (e.g., usable to decrypt secured sensitive data) across multiple locations (e.g., under the control of multiple entities with the ability to perform security checks), the sensitive data may be backed up and recovered securely. The disclosed methods for the backup and/or recovery of secure data may reduce the likelihood of indefinite loss of access to VMKs and/or data encrypted using the VMKs. Additionally, the likelihood of malicious parties gaining access to the VMKs (and/or data encrypted using the VMKs) during the management processes may be reduced.

Thus, embodiments disclosed herein may provide an improved computing device that is able to reduce the likelihood of a malicious party intercepting accessed sensitive data. Accordingly, the disclosed process provides for both an embodiment in computing technology and an improved method for managing secure data access.

Figure 4:
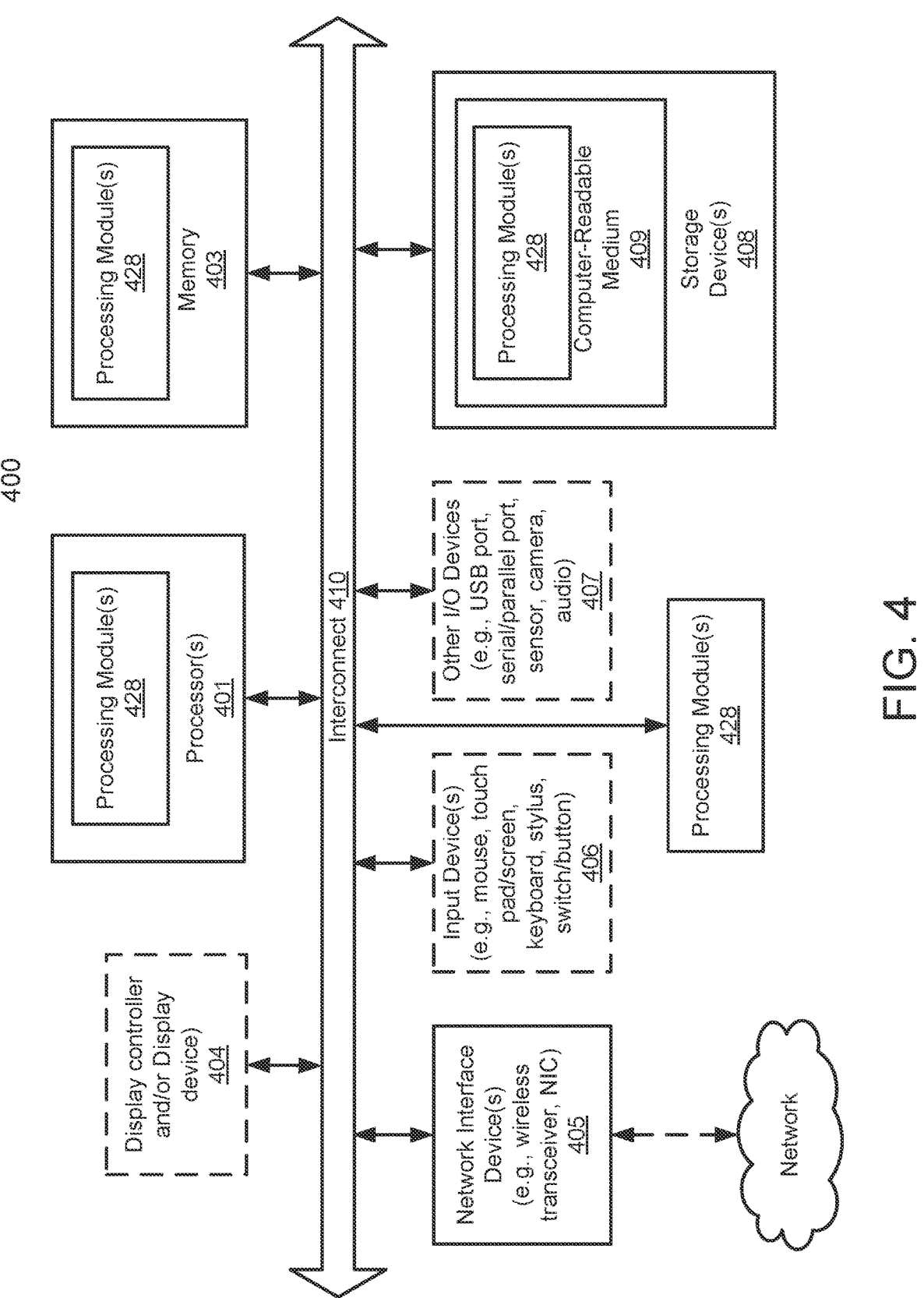
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing volume master keys (VMKs), the method comprising:

by an endpoint device:

obtaining a restore request for the endpoint device to recover a VMK of the VMKs, the VMK to be recovered is multiply encrypted and stored remotely to the endpoint device, and the restore request is initiated by a first user of a first data processing system that has lost possession of a first copy of the VMK, the first copy of the VMK being stored in a first trusted platform module (TPM) of the first data processing system prior to being lost;

generating an endpoint key pair based on the restore request being verified as a verifiable request by a management plane that is separate from the endpoint device prior to the endpoint device obtaining the restore request;

generating a request bundle based on the restore request, the request bundle comprising a first portion of the endpoint key pair, the request bundle lacking decryption keys usable to decrypt the multiply encrypted VMK, and the decryption keys being stored separately and remotely to the endpoint device;

initiating performance of a recovery process for the endpoint device to obtain an endpoint encrypted VMK using the request bundle; and decrypting the endpoint encrypted VMK using a second portion of the endpoint key pair to obtain a second copy of the VMK for the endpoint device to recover the VMK for the first data processing system that has lost possession of the first copy of the VMK.

2. The method of claim 1, wherein the recovery process comprises:

obtaining, by the first data processing system, the request bundle and the multiply encrypted VMK;

decrypting, by the first data processing system, a first layer of encryption of the multiply encrypted VMK using a second portion of a receptacle key pair to obtain a singly encrypted VMK, the receptacle key pair being a portion of the decryption keys, and generation of the receptacle key pair being initiated by an administrator; and providing, by the first data processing system, the singly encrypted VMK and the request bundle to a backup manager, the backup manager maintaining a manager key pair of the decryption keys, the backup manager being a separate computing device from all of the endpoint device, the management plane, and the first data processing system.

3. The method of claim 2, wherein the recovery process further comprises:

obtaining, by the backup manager and from the first data processing system, the singly encrypted VMK and the request bundle;

decrypting, by the backup manager, the singly encrypted VMK using a second portion of the manager key pair to obtain the second copy of the VMK;

encrypting, by the backup manager, the second copy of the VMK using the first portion of the endpoint key pair to obtain the endpoint encrypted VMK; and providing, by the backup manager, the endpoint encrypted VMK to the endpoint device.

4. The method of claim 3, further comprising:

prior to obtaining the restore request, initiating, by a second data processing system, performance of a backup process to obtain the multiply encrypted VMK, the second data processing system also being a separate computing device from all of the endpoint device, the management plane, the backup manager, and the first data processing system.

5. The method of claim 4, wherein the backup process comprises:

providing, by the second data processing system, a backup request for the VMK to a prior endpoint, the VMK being stored on the prior endpoint, and the backup request being initiated by a second user; and obtaining, by the second data processing system, the multiply encrypted VMK from the prior endpoint, using a first portion of the manager key pair and a first portion of the receptacle key pair.

6. The method of claim 5, wherein the backup process further comprises:

obtaining, by the prior endpoint, the backup request;

encrypting, by the prior endpoint, the VMK using the first portion of the manager key pair to obtain the singly encrypted VMK; and encrypting, by the prior endpoint, the singly encrypted VMK using the first portion of the receptacle key pair to obtain the multiply encrypted VMK.

7. The method of claim 6, wherein the administrator is authorized to initiate the generation of the receptacle key pair, and the first user and the second user lack authorization to initiate the generation the receptacle key pair.

8. The method of claim 7, wherein the receptacle key pair is assigned to the administrator for exclusive use.

9. The method of claim 8, wherein the restore request comprises a work request for generating the endpoint key pair, the work request being signed by the first user, and permission for generating the endpoint key pair being delegated to the first user.

10. The method of claim 9, wherein the restore request further comprises an attestation indicating that the first user has ownership of the endpoint.

11. The method of claim 1, wherein the method further comprises, by the endpoint device and after decrypting the endpoint encrypted VMK using the second portion of the endpoint key pair to obtain the second copy of the VMK:

storing the second copy of the VMK recovered for the first data processing system in a second TPM of the endpoint device instead of the first TPM of the first data processing system, the endpoint device managing the second copy of the VMK for the first data processing system using the second TPM.

12. A non-transitory machine-readable medium having instructions stored therein, which when executed by a processor of an endpoint device, cause the processor of the endpoint device to perform operations for managing volume master keys (VMKs), the operations comprising:

obtaining a restore request for the endpoint device to recover a VMK of the VMKs, the VMK to be recovered is multiply encrypted and stored remotely to the endpoint device, and the restore request is initiated by a first user of a first data processing system that has lost possession of a first copy of the VMK, the first copy of the VMK being stored in a first trusted platform module (TPM) of the first data processing system prior to being lost;

generating an endpoint key pair based on the restore request being verified as a verifiable request by a management plane that is separate from the endpoint device prior to the endpoint device obtaining the restore request;

generating a request bundle based on the restore request, the request bundle comprising a first portion of the endpoint key pair, the request bundle lacking decryption keys usable to decrypt the multiply encrypted VMK, and the decryption keys being stored separately and remotely to the endpoint device;

initiating performance of a recovery process for the endpoint device to obtain an endpoint encrypted VMK using the request bundle; and decrypting the endpoint encrypted VMK using a second portion of the endpoint key pair to obtain a second copy of the VMK for the endpoint device to recover the VMK for the first data processing system that has lost possession of the first copy of the VMK.

13. The non-transitory machine-readable medium of claim 12, wherein the recovery process comprises:

obtaining, by the first data processing system, the request bundle and the multiply encrypted VMK;

decrypting, by the first data processing system, a first layer of encryption of the multiply encrypted VMK using a second portion of a receptacle key pair to obtain a singly encrypted VMK, the receptacle key pair being a portion of the decryption keys, and generation of the receptacle key pair being initiated by an administrator; and providing, by the first data processing system, the singly encrypted VMK and the request bundle to a backup manager, the backup manager maintaining a manager key pair of the decryption keys, the backup manager being a separate computing device from all of the endpoint device, the management plane, and the first data processing system.

14. The non-transitory machine-readable medium of claim 13, wherein the recovery process further comprises:

obtaining, by the backup manager and from the first data processing system, the singly encrypted VMK and the request bundle;

decrypting, by the backup manager, the singly encrypted VMK using a second portion of the manager key pair to obtain the second copy of the VMK;

encrypting, by the backup manager, the second copy of the VMK using the first portion of the endpoint key pair to obtain the endpoint encrypted VMK; and providing, by the backup manager, the endpoint encrypted VMK to the endpoint device.

15. The non-transitory machine-readable medium of claim 14, the operations further comprising:

prior to obtaining the restore request, initiating, by a second data processing system, performance of a backup process to obtain the multiply encrypted VMK, the second data processing system also being a separate computing device from all of the endpoint device, the management plane, the backup manager, and the first data processing system.

16. The non-transitory machine-readable medium of claim 15, wherein the backup process comprises:

providing, by the second data processing system, a backup request for the VMK to a prior endpoint, the VMK being stored on the prior endpoint, and the backup request being initiated by a second user; and obtaining, by the second data processing system, the multiply encrypted VMK from the prior endpoint, using a first portion of the manager key pair and a first portion of the receptacle key pair.

17. A data processing system configured as an endpoint device, comprising:

a processor; and a memory coupled to the processor to store instructions, which when executed by the processor, cause the processor to perform operations for managing volume master keys (VMKs), the operations comprising:

obtaining a restore request for the endpoint device to recover a VMK of the VMKs, the VMK to be recovered is multiply encrypted and stored remotely to the endpoint device, and the restore request is initiated by a first user of a first data processing system that has lost possession of a first copy of the VMK, the first copy of the VMK being stored in a first trusted platform module (TPM) of the first data processing system prior to being lost;

generating an endpoint key pair based on the restore request being verified as a verifiable request by a management plane that is separate from the endpoint device prior to the endpoint device obtaining the restore request, generating a request bundle based on the restore request, the request bundle comprising a first portion of the endpoint key pair, the request bundle lacking decryption keys usable to decrypt the multiply encrypted VMK, and the decryption keys being stored separately and remotely to the endpoint device, initiating performance of a recovery process for the endpoint device to obtain an endpoint encrypted VMK using the request bundle; and decrypting the endpoint encrypted VMK using a second portion of the endpoint key pair to obtain a second copy of the VMK for the endpoint device to recover the VMK for the first data processing system that has lost possession of the first copy of the VMK.

18. The data processing system of claim 17, wherein the recovery process comprises:

obtaining, by the first data processing system, the request bundle and the multiply encrypted VMK;

decrypting, by the first data processing system, a first layer of encryption of the multiply encrypted VMK using a second portion of a receptacle key pair to obtain a singly encrypted VMK, the receptacle key pair being a portion of the decryption keys, and generation of the receptacle key pair being initiated by an administrator; and providing, by the first data processing system, the singly encrypted VMK and the request bundle to a backup manager, the backup manager maintaining a manager key pair of the decryption keys, the backup manager being a separate computing device from all of the endpoint device, the management plane, and the first data processing system.

19. The data processing system of claim 18, wherein the recovery process further comprises:

obtaining, by the backup manager and from the first data processing system, the singly encrypted VMK and the request bundle;

decrypting, by the backup manager, the singly encrypted VMK using a second portion of the manager key pair to obtain the second copy of the VMK;

encrypting, by the backup manager, the second copy of the VMK using the first portion of the endpoint key pair to obtain the endpoint encrypted VMK; and providing, by the backup manager, the endpoint encrypted VMK to the endpoint device.

20. The data processing system of claim 19, the operations further comprising:

prior to obtaining the restore request, initiating, by a second data processing system, performance of a backup process to obtain the multiply encrypted VMK, the second data processing system also being a separate computing device from all of the endpoint device, the management plane, the backup manager, and the first data processing system.

* * * * *